United States Patent
Ong et al.

(10) Patent No.: US 8,009,681 B2
(45) Date of Patent: Aug. 30, 2011

(54) METHODS AND SYSTEMS FOR INTERWORKING RSVP-BASED EXTERNAL CONTROL PLANE PROTOCOLS WITH INTERNAL CONTROL PLANE PROTOCOLS

(75) Inventors: Lyndon Y. Ong, Sunnyvale, CA (US); Mahad Ahmed, San Jose, CA (US); Sandeep Bhat, Mountain View, CA (US)

(73) Assignee: Ciena Corporation, Linthicum, MD (US)

(*) Notice: Subject to any disclaimer, the term of this patent is extended or adjusted under 35 U.S.C. 154(b) by 461 days.

(21) Appl. No.: 11/726,582

(22) Filed: Mar. 21, 2007

(65) Prior Publication Data
US 2008/0232372 A1  Sep. 25, 2008

(51) Int. Cl.
*H04L 12/56* (2006.01)
(52) U.S. Cl. .................................................. 370/401
(58) Field of Classification Search .................. 370/229, 370/389, 401, 352–356
See application file for complete search history.

(56) References Cited

U.S. PATENT DOCUMENTS

2004/0076151 A1* 4/2004 Fant et al. ..................... 370/389
2004/0156313 A1* 8/2004 Hofmeister et al. .......... 370/229

* cited by examiner

*Primary Examiner* — Dang T Ton
*Assistant Examiner* — Kevin Lee
(74) *Attorney, Agent, or Firm* — Clements Bernard PLLC; Christopher L. Bernard; Lawrence A. Baratta, Jr.

(57) ABSTRACT

The present invention provides improved methods and systems for interworking Resource Reservation Protocol (RSVP)-based external control plane protocols with internal control plane protocols, such as Optical Signaling and Routing Protocol (OSRP). The present invention utilizes only a high-level mapping in which a trigger is created in the internal control plane protocol to initiate the desired internal control plane action or vice versa. The external control plane protocol messages and fields are encapsulated as data in the internal control plane messages and fields and are processed only at the remote end of the internal domain. By encapsulating the entirety or parts of the external control plane protocol messages and fields ensures that necessary information is carried from an ingress border node to an egress border node. At the egress border node, the encapsulated external control plane protocol messages and fields are mapped back to the external control plane protocol, without having to make changes to the internal control plane protocol or perform processing at intermediate nodes.

27 Claims, 8 Drawing Sheets

| Bits | | | | | | | | |
|---|---|---|---|---|---|---|---|---|
| 8 | 7 | 6 | 5 | 4 | 3 | 2 | 1 | |
| 0 | 1 | 1 | 0 | 0 | 1 | 0 | 1 | Octet 1 |
| 1 ext | Coding Standard | | IE Instruction Field | | | | | Octet 2 |
| | | | | Flag | Pass Along | IE Action Indicator | | |
| Length of Information Element (N Octets) | | | | | | | | Octet 3 |
| | | | | | | | | Octet 4 |
| | | | | | | | | Octet 5 |
| RSVP Message Content | | | | | | | | Octet 5+(N-1) |

*Pass Along Request Bit is Set

FIG. 5

| Bits | | | | | | | | |
|---|---|---|---|---|---|---|---|---|
| 8 | 7 | 6 | 5 | 4 | 3 | 2 | 1 | |
| 0 | 1 | 1 | 0 | 0 | 1 | 0 | 0 | Octet 1 |
| | Coding Standard | | IE Identifier | | | | | |
| 1 ext | IE Instruction Field | | | | | | | Octet 2 |
| | Flag | Pass Along | IE Action Indicator | | | | | |
| Length of Information Element | | | | | | | | Octet 3 |
| | | | | | | | | Octet 4 |
| ack | | | | | | | | Octet 5 |
| OUNI Message ID (4 Octets) | | | | | | | | Octet 5.1 |
| | | | | | | | | Octet 5.2 |
| | | | | | | | | Octet 5.3 |

*Pass Along Request Bit is Set

METHODS AND SYSTEMS FOR INTERWORKING RSVP-BASED EXTERNAL CONTROL PLANE PROTOCOLS WITH INTERNAL CONTROL PLANE PROTOCOLS

FIELD OF THE INVENTION

The present invention relates generally to the telecommunications and optical networking fields. More specifically, the present invention relates to improved methods and systems for interworking Resource Reservation Protocol (RSVP)-based external control plane protocols with internal control plane protocols, such as Optical Signaling and Routing Protocol (OSRP).

BACKGROUND OF THE INVENTION

In order for the optical networking equipment of various vendors to interoperate efficiently, standard control plane protocols must be supported at the associated interfaces. In the International Telecommunications Union (ITU-T) Automatically Switched Optical Network (ASON) model, these external interfaces are the User-Network Interfaces (UNIs) and the External Network-Network Interfaces (E-NNIs). The external interfaces are typically based on RSVP, which is a standard defined by the Internet Engineering Task Force (IETF). In general, RSVP is a signaling protocol used in Optical UNI (OUNI) and E-NNI to reserve network resources between UNI clients end-to-end through the optical domain. RSVP is part of the Internet Integrated Service (IIS) model, which ensures best-effort service, real-time service, and controlled link-sharing. The RSVP definition includes basic procedures, messages, and object formats for signaling. At the same time, the internal control plane within the domain of a particular type of optical networking equipment runs its own internal control plane protocols, such as OSRP, with features and procedures that differ from the standards.

Existing standards do not specify how the above interoperability should be provided, but typically assume that there is some mapping between the messages and fields at the external interfaces. Examples include ITU-T Specifications G.7713, G.7713.1, G.7713.2, and G.7713.3, which define protocol-independent messages and parameters that may be used as a basis for mapping to the internal control plane protocols. Another example includes the Optical Interconnect Forum (OIF) Generalized Multi-Protocol Label Switching (GMPLS) Interworking draft document, which illustrates how mapping from the OIF UNI and E-NNI to an internal domain using GMPLS. Thus, the current state-of-the-art assumes that there is a message-by-message and parameter-by-parameter mapping from the external control plane protocol to the internal control plane protocol.

This detailed mapping of all of the protocol messages and elements results in an extremely close linkage between the external interface and the internal control plane protocol, making it difficult to use an external protocol that has different semantics, or requiring costly enhancements to the internal protocol such that it matches the mapping tables. Further, every time that a new feature is incorporated into the external protocol, the internal protocol must be changed to allow for mapping, thus adding cost and delay for development and testing, as well as potential for errors that may cause control plane failures. Mapping protocol messages and elements one-by-one from the external protocol to the internal protocol also adds considerable overhead due to the fact that some of the parameters in the external protocol have no counterpart in the internal protocol, yet it may be necessary to map these parameters back at the external interface of the remote end. Again, the internal protocol must be changed to allow for mapping, thus adding cost and delay for development and testing, as well as potential for errors that may cause control plane failures.

Further, RSVP requires that protocol sessions are periodically refreshed by repeating the original message or some summarized version thereof in order to keep a session alive. This requirement is unique to RSVP and is not associated with other protocols that utilize a more reliable lower layer, such as Transmission Control Protocol/Internet Protocol (TCP/IP) or Asynchronous Transfer Mode (ATM) ATM Adaption Layer (AAL). A straight mapping of these refresh messages introduces the potential for confusion in interpretation for the internal protocol, as well as additional protocol processing overhead and message traffic every time a refresh message is received.

Thus, what are still needed in the art are improved methods and systems for interworking RSVP-based external control plane protocols with internal control plane protocols, such as OSRP.

BRIEF SUMMARY OF THE INVENTION

In various exemplary embodiments, the present invention provides improved methods and systems for interworking RSVP-based external control plane protocols with internal control plane protocols, such as OSRP. Advantageously, the methods and systems of the present invention greatly reduce the coupling between the development and updating of the external and internal control plane protocols, as well as the processing required to handle RSVP refreshes within the network. These RSVP refreshes are passed on by intermediate nodes without being inspected by the control processor. This reduces the processing overhead at the intermediate nodes, allowing greater scalability, reduced control processor usage, and reduced cost and delay. Vendors that may be motivated to use the methods and systems of the present invention include those that use a non-RSVP-based internal control plane, such as a Constraint-Based Routing Label Distribution Protocol (CR-LDP) internal control plane or a Private Network-to-Network Interface/Private Network Node Interface (PNNI) internal control plane, as well as those that use a proprietary RSVP-based internal control plane. This potentially includes all optical control plane products.

In one exemplary embodiment, the present invention provides a method for interworking a Resource Reservation Protocol (RSVP)-based external control plane protocol with an internal control plane protocol, such as Optical Signaling and Routing Protocol (OSRP), including: given an external control plane protocol and an internal control plane protocol, performing a high-level mapping from an external control plane protocol message/field to an internal control plane protocol message/field at a near end of an internal domain, including: encapsulating the external control plane protocol message/field as data in the internal control plane protocol message/field; and creating a trigger in the internal control plane protocol message/field operable for initiating a desired internal control plane action; and processing the external control plane protocol message/field at a remote end of the internal domain. The encapsulated external control plane protocol message/field in the internal control plane protocol message/field is carried from an ingress border node to an egress border node through one or more intermediate nodes. The high-level mapping from the external control plane protocol message/field to the internal control plane protocol message/field at the near end of the internal domain is performed at the ingress border node. The external control plane protocol message/field processed at the remote end of the internal domain is processed at the egress border node. Processing the external control plane protocol message/field at the remote end of the internal domain includes mapping the external control plane protocol message/field back to the external control plane protocol. The encapsulated external control plane protocol message/field in the internal control plane protocol message/field is carried from the ingress border node to the egress border node through the one or more intermediate nodes without making changes to the internal control plane protocol. The encapsulated external control plane protocol message/field in the internal control plane protocol message/field is carried from the ingress border node to the egress border node through the one or more intermediate nodes without performing processing at the one or more intermediate nodes. Preferably, the external control plane protocol includes RSVP. Preferably, the internal control plane protocol includes OSRP.

In another exemplary embodiment, the present invention provides a system for interworking a Resource Reservation Protocol (RSVP)-based external control plane protocol with an internal control plane protocol, such as Optical Signaling and Routing Protocol (OSRP), including: given an external control plane protocol and an internal control plane protocol, a processor operable for performing a high-level mapping from an external control plane message/field to an internal control plane protocol message/field at a near end of an internal domain, including: a processor operable for encapsulating the external control plane protocol message/field as data in the internal control plane protocol message/field; and a processor operable for creating a trigger in the internal control plane protocol message/field operable for initiating a desired internal control plane action; and a processor operable for processing the external control plane protocol message/field at a remote end of the internal domain. The encapsulated external control plane protocol message/field in the internal control plane protocol message/field is carried from an ingress border node to an egress border node through one or more intermediate nodes. The processor operable for performing the high-level mapping from the external control plane protocol message/field to the internal control plane protocol message/field at the near end of the internal domain is resident at the ingress border node. The processor operable for processing the external control plane protocol message/field at the remote end of the internal domain is resident at the egress border node. The processor operable for processing the external control plane protocol message/field at the remote end of the internal domain is operable for mapping the external control plane protocol message/field back to the external control plane protocol. The encapsulated external control plane protocol message/field in the internal control plane protocol message/field is carried from the ingress border node to the egress border node through the one or more intermediate nodes without making changes to the internal control plane protocol. The encapsulated external control plane protocol message/field in the internal control plane protocol message/field is carried from the ingress border node to the egress border node through the one or more intermediate nodes without performing processing at the one or more intermediate nodes. Preferably, the external control plane protocol includes RSVP. Preferably, the internal control plane protocol includes OSRP.

In a further exemplary embodiment, the present invention provides a method for interworking a Resource Reservation Protocol (RSVP)-based external control plane protocol with an internal control plane protocol, such as Optical Signaling and Routing Protocol (OSRP), including: given an external control plane protocol and an internal control plane protocol, performing a high-level mapping from an external control plane protocol refresh message/field to an internal control plane protocol refresh message/field at a near end of an internal domain, including: encapsulating the external control plane protocol refresh message/field as data in the internal control plane protocol refresh message/field; and processing the external control plane protocol refresh message/field at a remote end of the internal domain. The encapsulated external control plane protocol refresh message/field in the internal control plane protocol refresh message/field is carried from an ingress border node to an egress border node through one or more intermediate nodes. The high-level mapping from the external control plane protocol refresh message/field to the internal control plane protocol refresh message/field at the near end of the internal domain is performed at the ingress border node. The external control plane protocol refresh message/field processed at the remote end of the internal domain is processed at the egress border node. Processing the external control plane protocol refresh message/field at the remote end of the internal domain includes mapping the external control plane protocol refresh message/field back to the external control plane protocol. The encapsulated external control plane protocol refresh message/field in the internal control plane protocol refresh message/field is carried from the ingress border node to the egress border node through the one or more intermediate nodes without making changes to the internal control plane protocol. The encapsulated external control plane protocol refresh message/field in the internal control plane protocol refresh message/field is carried from the ingress border node to the egress border node through the one or more intermediate nodes without performing processing at the one or more intermediate nodes. Preferably, the external control plane protocol includes RSVP. Preferably, the internal control plane protocol includes OSRP.

BRIEF DESCRIPTION OF THE DRAWINGS

The present invention is illustrated and described herein with reference to the various drawings, in which like reference numbers are used to denote like method steps/system components, as appropriate, and in which.

DETAILED DESCRIPTION OF THE INVENTION

Again, in various exemplary embodiments, the present invention provides improved methods and systems for interworking RSVP-based external control plane protocols with internal control plane protocols, such as OSRP. Advantageously, the methods and systems of the present invention greatly reduce the coupling between the development and updating of the external and internal control plane protocols, as well as the processing required to handle RSVP refreshes within the network. These RSVP refreshes are passed on by intermediate nodes without being inspected by the control processor. This reduces the processing overhead at the intermediate nodes, allowing greater scalability, reduced control processor usage, and reduced cost and delay. Vendors that may be motivated to use the methods and systems of the present invention include those that use a non-RSVP-based internal control plane, such as a CR-LDP or a PNNI internal control plane, as well as those that use a proprietary RSVP-based internal control plane. This potentially includes all optical control plane products.

Instead of simply mapping all of the external control plane protocol messages and fields directly into the internal control plane protocol messages and fields, the present invention utilizes only a high-level mapping in which a trigger is created in the internal control plane protocol to initiate the desired internal control plane action or vice versa. The external control plane protocol messages and fields are encapsulated as data in the internal control plane messages and fields and are processed only at the remote end of the internal domain. By encapsulating the entirety or parts of the external control plane protocol messages and fields ensures that necessary information is carried from an ingress border node to an egress border node. At the egress border node, the encapsulated external control plane protocol messages and fields are mapped back to the external control plane protocol, without having to make changes to the internal control plane protocol or perform processing at intermediate nodes.

Figure 1:
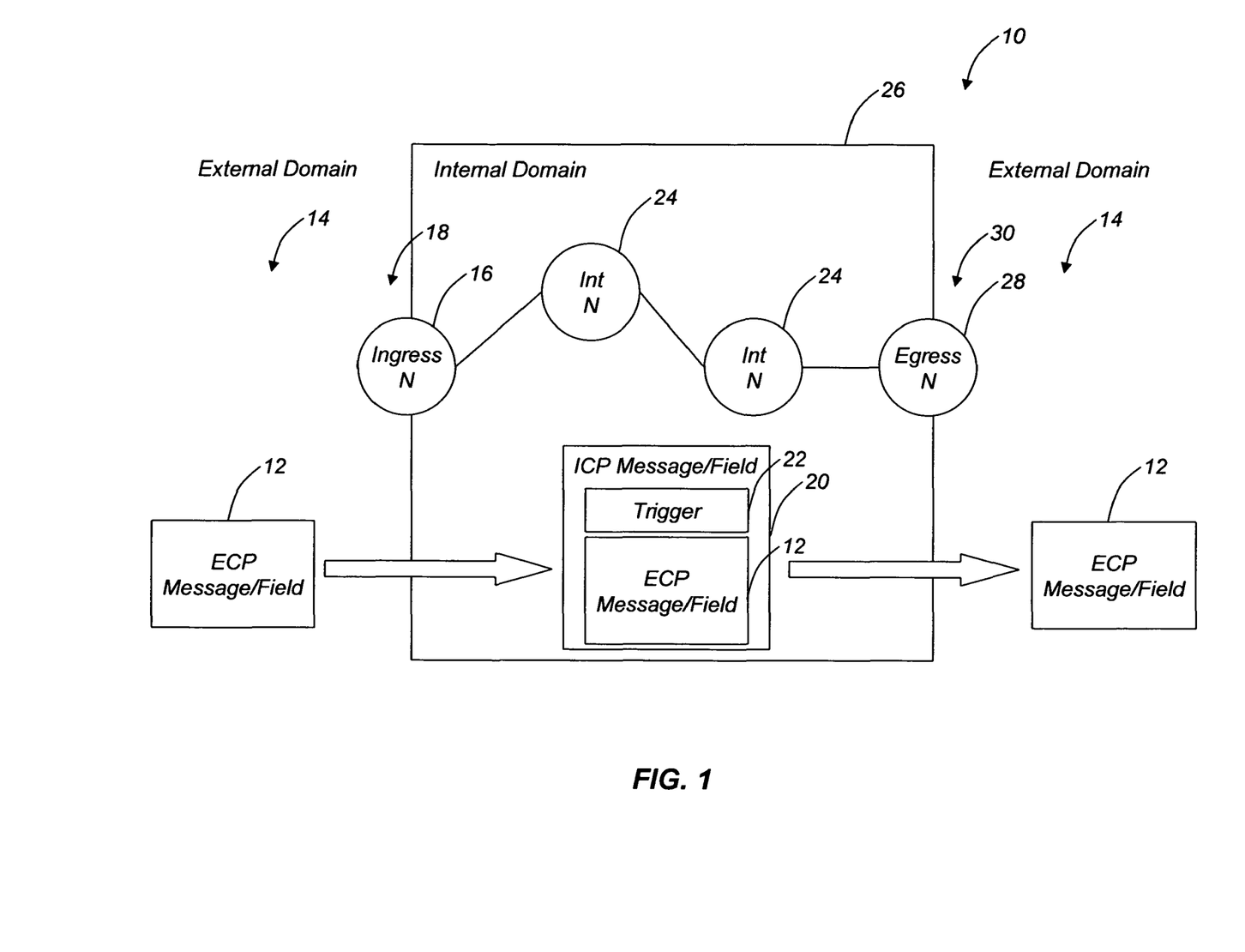
FIG. 1 is a schematic diagram illustrating, in a broad conceptual overview, the method for interworking RSVP-based external control plane protocols with internal control plane protocols, such as OSRP, of the present invention, external control plane messages and fields being encapsulated in internal control plane messages and fields and internal control plane action triggers being generated and utilized.

This method 10 is illustrated, in a broad conceptual overview, in FIG. 1. An external control plane protocol message/field 12 in the external domain 14 is received at an ingress node 16 at the near end interface 18. The external control plane message/field 12 is encapsulated as data in an internal control plane message/field 20 and a trigger 22 is created in the internal control plane protocol to initiate a desired internal control plane action, for example. The internal control plane message/field 20 and encapsulated external control plane message/field 12 are transported between the intermediate nodes 24 of the internal domain 26, which perform little or no processing on the internal control plane message/field 20 and encapsulated external control plane message/field 12. Finally, the internal control plane message/field 20 and encapsulated external control plane message/field 12 are received at an egress node 28 at the remote end interface 30 and the external control plane message/field 12 is mapped back to the external control plane protocol.

This effectively isolates the internal control plane protocol from the standard interface and any changes or extensions that are applied to the standard protocol. By limiting message-by-message mapping to only points at which an action is necessary in the internal network domain, the processing of messages is greatly reduced, as little or no processing is performed by intermediate nodes. It is also possible to separately encapsulate or indicate the Message ID in order to support efficient interworking with SVP refresh, which uses the Message ID when performing summary refresh. Only the Message ID is sent, and not the full message contents.

Figure 2:
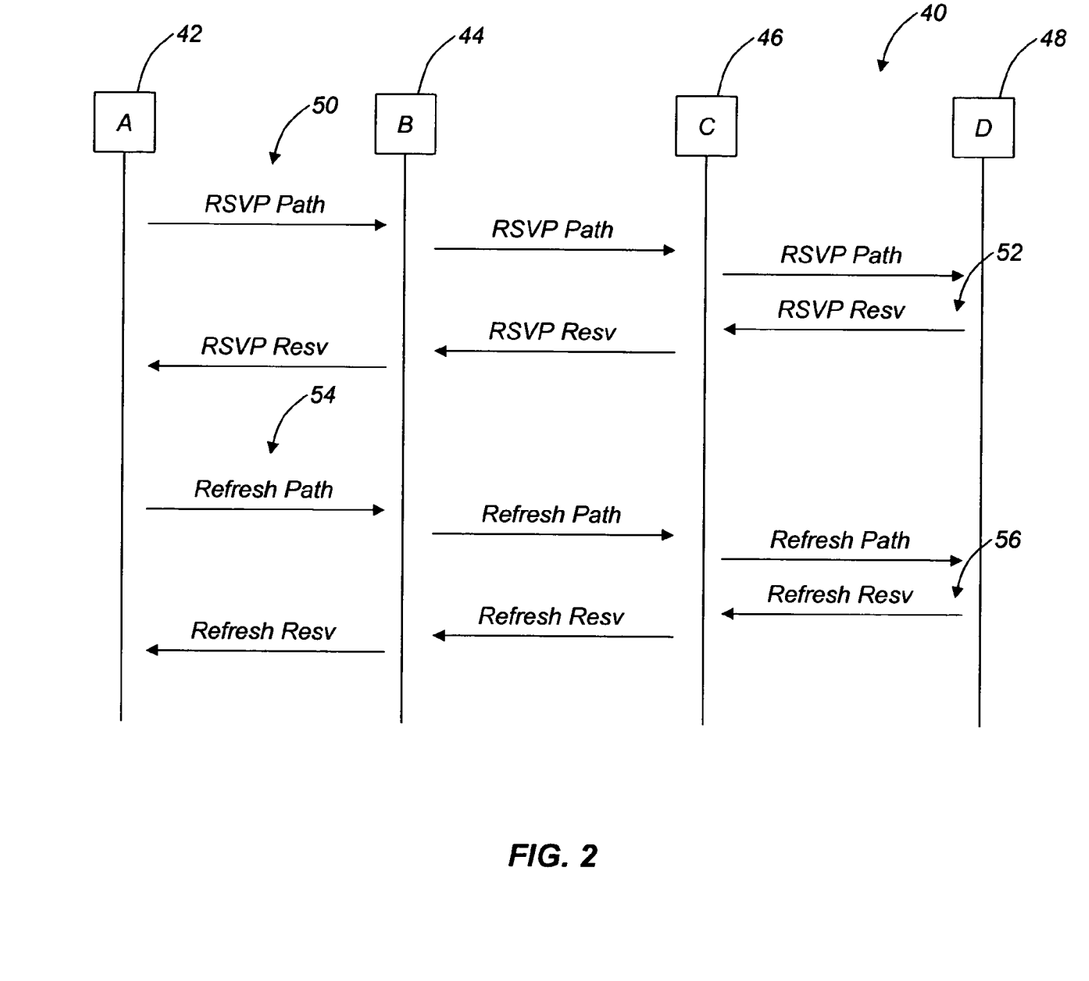
FIG. 2 is a schematic diagram illustrating the normal operation of RSVP in a uniform environment of RSVP-capable nodes.

FIG. 2 is a schematic diagram illustrating the normal operation of RSVP 40 in a uniform environment of RSVP-capable nodes. There are two fundamental RSVP message types: Path and Resv, which are used to establish a lightpath. Path and Resv states are explicitly removed using PathTear and ResvTear messages. As illustrated, Node A 42 initiates a connection request using an RSVP Path message 50, with Node D 48 being the destination address. At Node B 44, this causes resource reservation within the node and triggers an RSVP Path message 50 to Node C 46. Likewise, at Node C 46, this causes resource reservation within the node and triggers an RSVP Path message 50 to Node D 48. Node D responds affirmatively to the connection request with an RSVP Resv message 52, which is passed to Node A 42 through Nodes C 46 and B 44. Subsequently, RSVP requires that periodic refresh messages (Refresh Path 54 and Refresh Resv 56) be sent to maintain the path. If the periodic refresh messages are not received before a timer expires, then the path is released.

Figure 3:
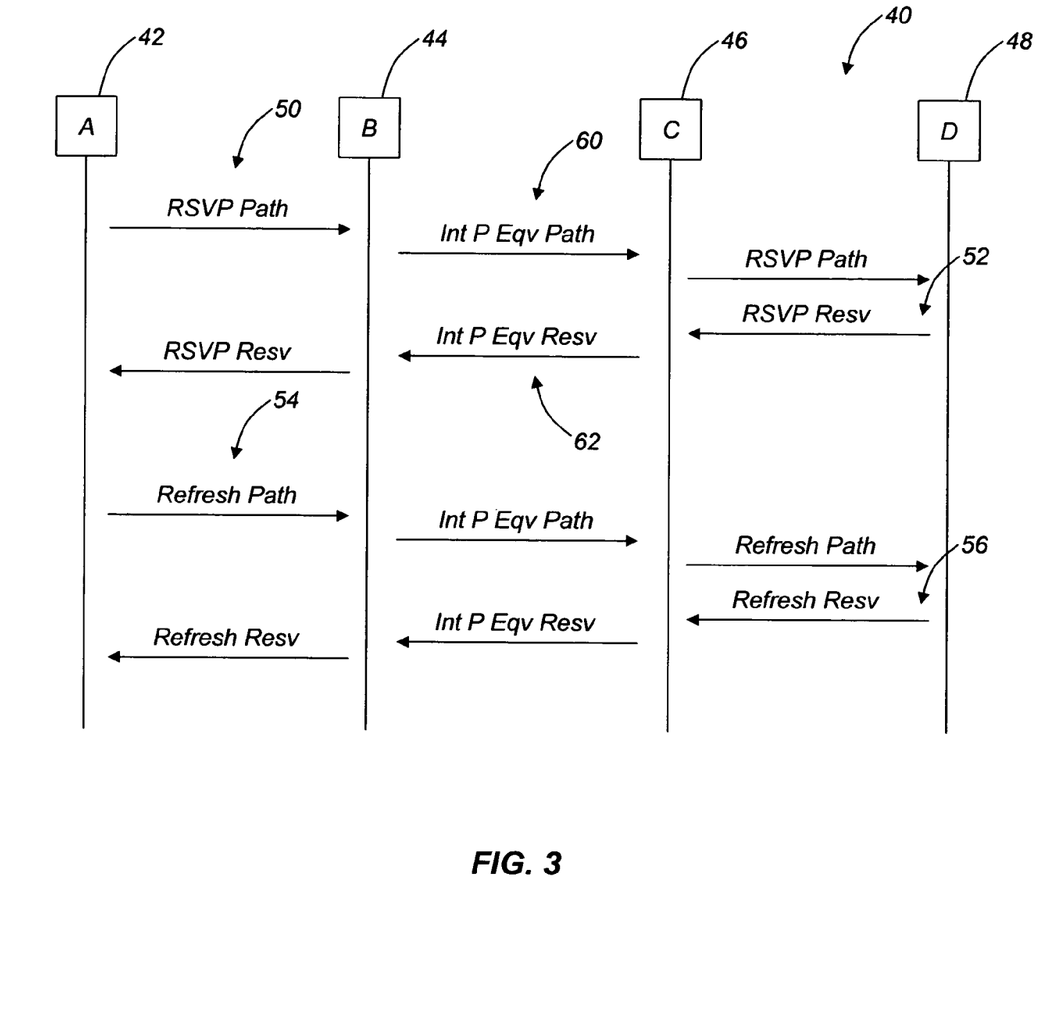
FIG. 3 is a schematic diagram illustrating the mapping or translation of RSVP messages to an internal protocol equivalent when interworking RSVP with a non-RSVP-based internal protocol.

FIG. 3 is a schematic diagram illustrating the mapping or translation of RSVP messages to an internal protocol equivalent when interworking RSVP with a non-RSVP-based internal protocol (via Int P Eqv Path 60 and Int P Eqv Resv 62 messages). This type of mapping or translation may occur at the boundary between networks, for example, where an RSVP-based protocol is used as the network-to-network interface, but the internal protocol is non-RSVP-based, such as OSRP. The OSRP cloud supports the following RSVP signaling scenarios: 1) successful connection establishment, 2) connection rejection by the network, 3) connection rejection by the destination client, 4) connection tear down by the source client, 5) connection tear down by the destination client, and 6) connection tear down by the network. The requirements associated with OSRP essentially involve creating and deleting sub-network connections (SNCs) at the request of an OUNI service task and tunneling RSVP messages across the OSRP cloud to an egress border node.

Figure 4:
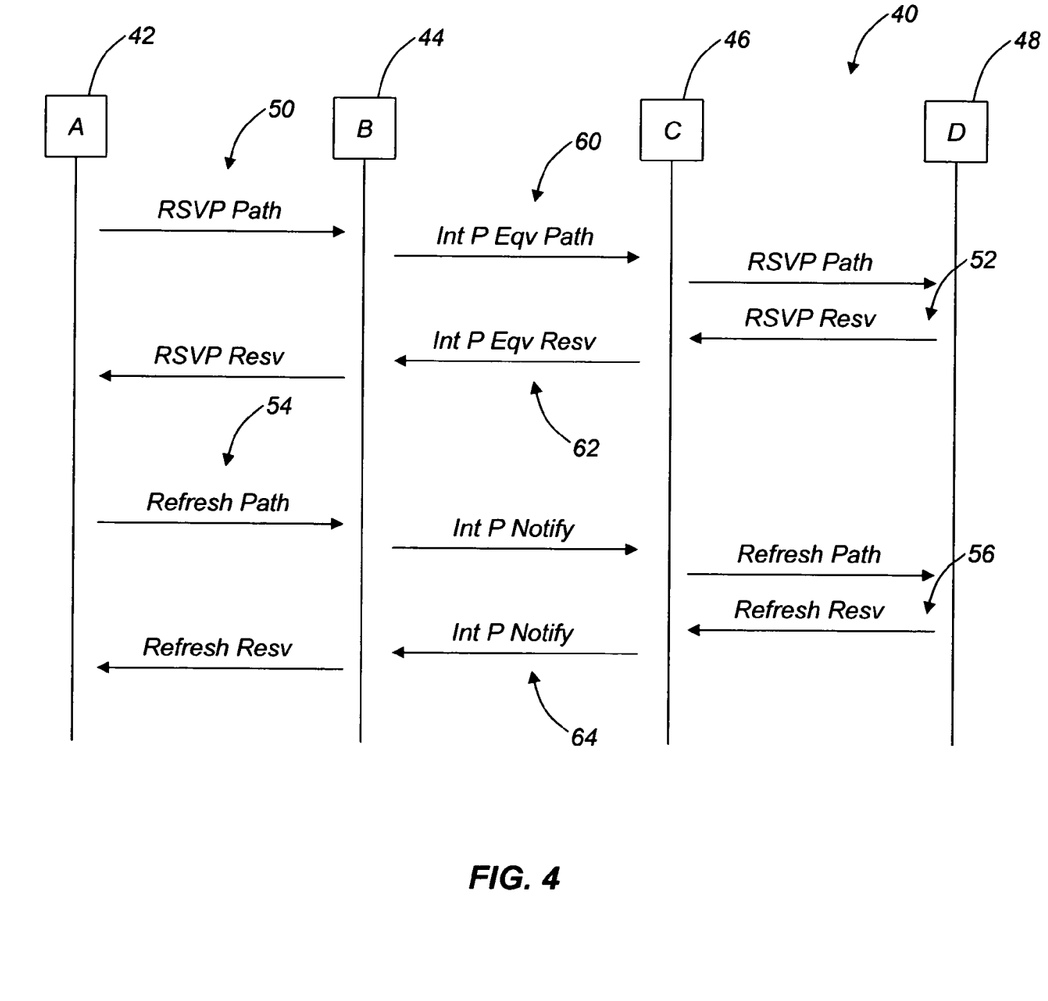
FIG. 4 is a schematic diagram illustrating more efficient indirect, context-dependent mapping through the encapsulation of RSVP messages within an internal protocol equivalent when interworking RSVP with a non-RSVP-based internal protocol.

FIG. 4 is a schematic diagram illustrating more efficient indirect, context-dependent mapping through the encapsulation of RSVP messages within an internal protocol equivalent when interworking RSVP with a non-RSVP-based internal protocol. The RSVP message is not mapped directly to a specific corresponding internal protocol message, but, rather, a context-dependent mapping is performed whereby the initial RSVP Resv message 52 is mapped to a connection request message in the internal protocol, while subsequent Refresh Path messages 54 are not required to be mapped except to an Int P Notify message 64 in the internal protocol. This Int P Notify message 64 carries information, but does not change the state of the protocol when received. The Int P Notify message 64 is subject to very limited processing overhead at the internal nodes, simplifying the processing required for interworking with RSVP.

Thus, in existing implementations, a per-element mapping is performed. In other words, each protocol element found in the received Path or Resv message is mapped to a corresponding protocol element in the corresponding internal protocol message. For example, a Path message contains many protocol elements, some of which may be relevant to the internal protocol and some of which may not. The Path message Sender_Template, for example, specifies the sender of the information, i.e., the originator of the connection. This may, under certain circumstances, map to an internal protocol element, such as a Calling_Party address information element in OSRP, or, under other circumstances, may be more simple to map to a transparent internal protocol element, depending upon the context. If the RSVP interface is an OIF UNI, another RSVP element, the Source_TNA, is actually mapped to the Calling_Party address information element and the Sender_Template may be carried transparently in a new internal protocol element, defined below.

Figure 5:
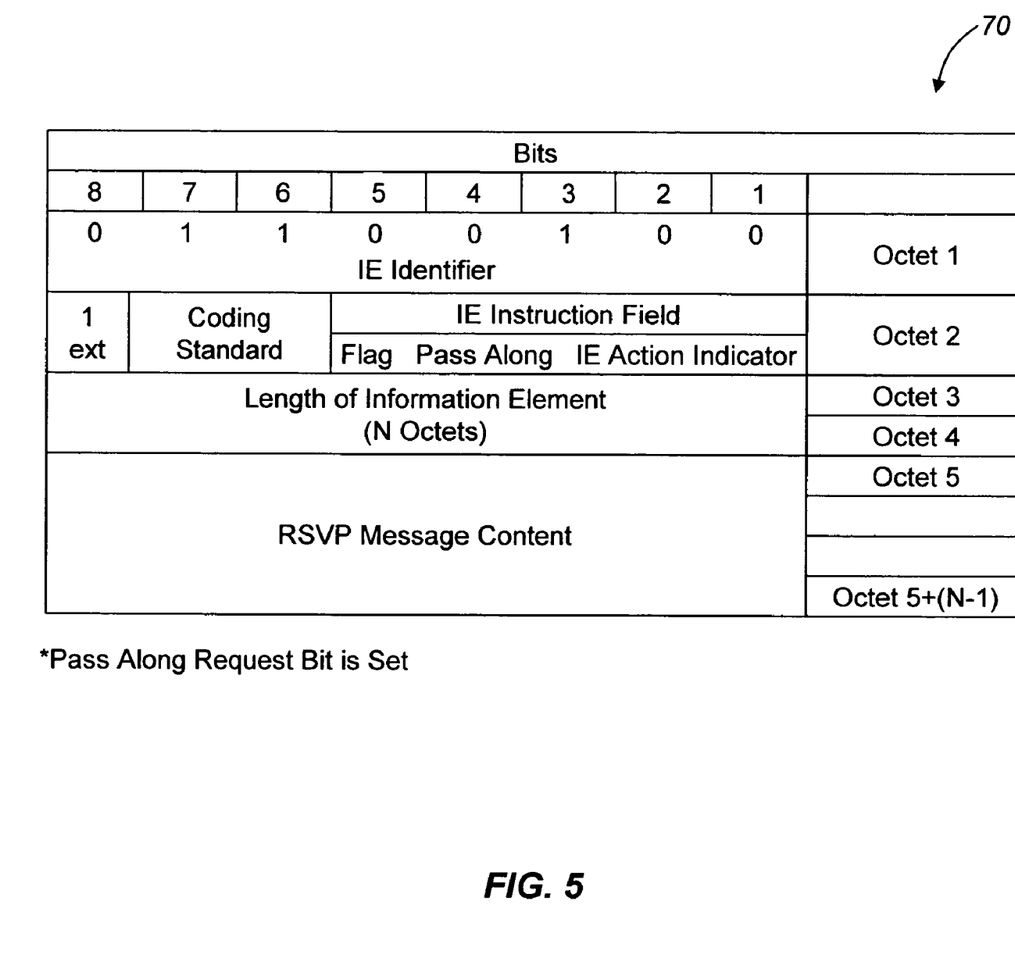
FIG. 5 is a schematic diagram illustrating the OUNI_Data information element format of the present invention.

FIG. 5 is a schematic diagram illustrating the OUNI_Data information element format of the present invention, added to support OUNI signaling. This information element (IE) is used to tunnel RSVP messages from one UNI client to another UNI client. The contents of the object are meaningless to OSRP and encoded as opaque data. The egress NE extracts the RSVP message from the IE and passes it to the RSVP processing engine. The IE may be present in the Setup, Release, or Notify messages.

Figure 6:
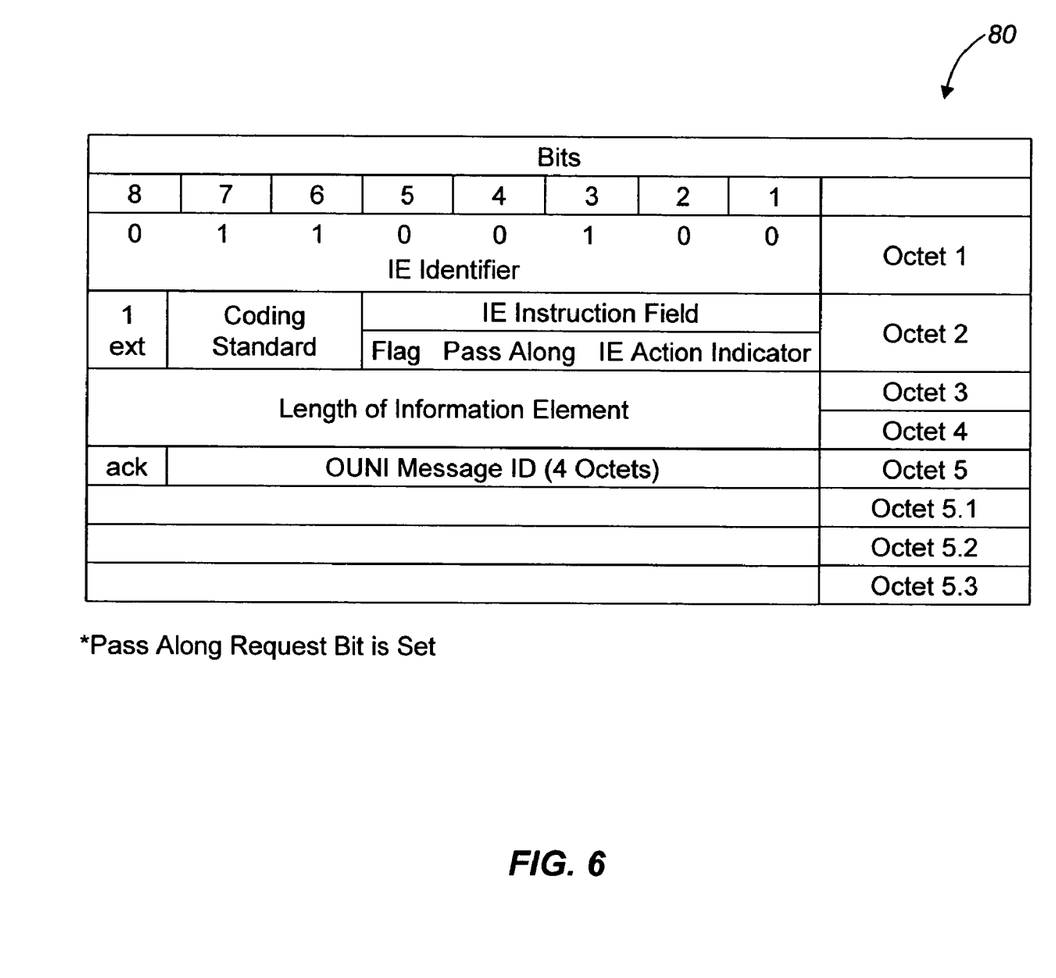
FIG. 6 is a schematic diagram illustrating the OUNI_Message ID information element format of the present invention.

FIG. 6 is a schematic diagram illustrating the OUNI_Message ID information element format of the present invention, also added to support OUNI signaling. As above, this information element (IE) may be present in the Setup, Release, or Notify messages. OUNI_Message ID is always "0" when present in the Setup and Release messages. The Ack bit is relevant only in the Notify message. When the Ack bit is "1," the message is a Notify_Ack.

Figure 7:
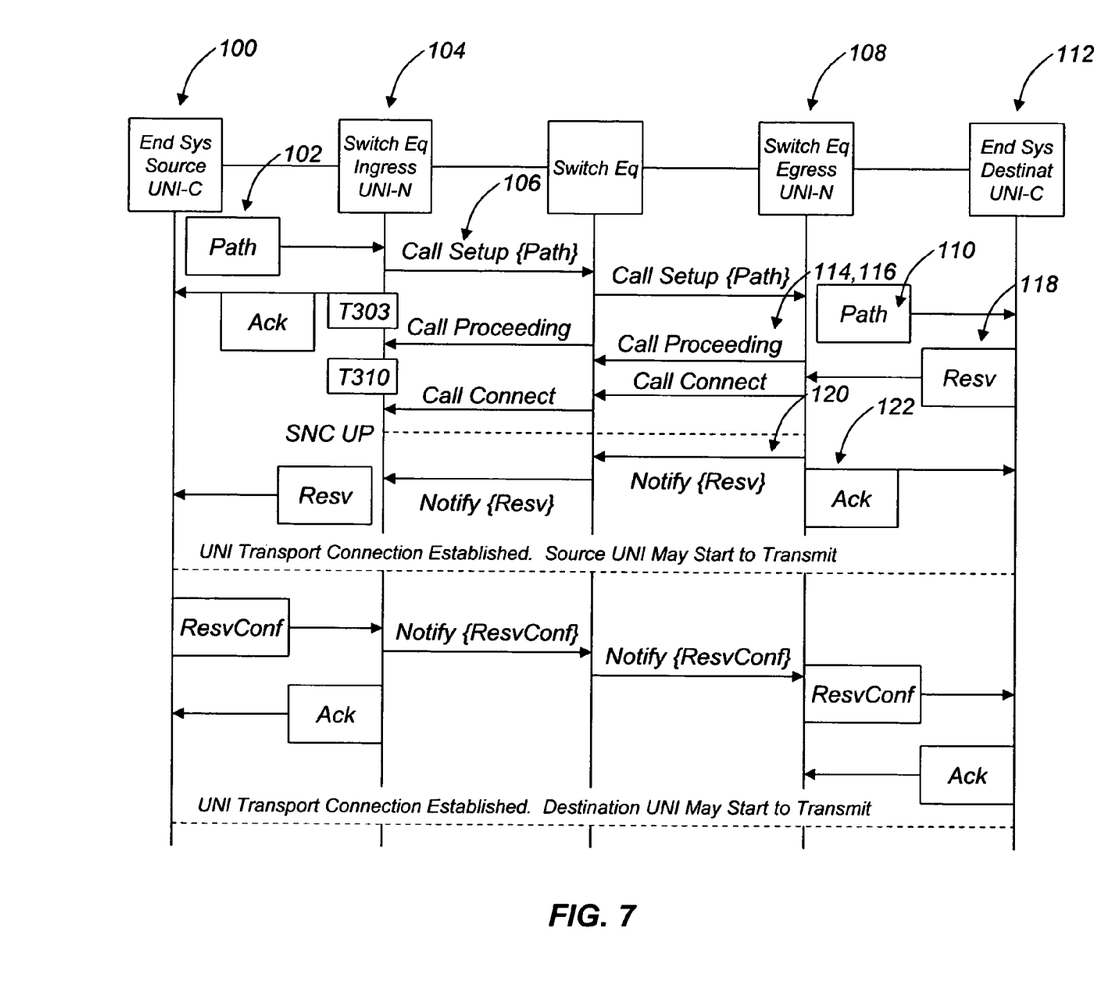
FIG. 7 is a schematic diagram illustrating an exemplary embodiment of a message sequence used for successful call setup from source UNI-C, in accordance with the methods and systems of the present invention.

FIG. 7 is a schematic diagram illustrating an exemplary embodiment of a message sequence used for successful call setup from source UNI-C, in accordance with the methods and systems of the present invention. Connection setup is initiated from the left-hand end system 100 using an RSVP message (Path) 102. Upon reaching the ingress network switch 104, this triggers the setup of the connection using the internal network protocol (Call Setup) 106. The contents of the Path message 102, which are end-to-end significant, may be encapsulated within the Call Setup message 106 and not processed at intermediate nodes within the network. At the egress network switch 108, the Call Setup message 106 triggers the generation of a Path message 110 at the RSVP-based interface with the right-hand end system 112, including end-to-end significant RSVP-based information that has been carried, encapsulated, across the network. After the Path message 102 is sent, connection setup proceeds independently within the network, using the internal network protocol (Call Proceeding and Call Connect messages 114, 116). This is not tied to any actions at the boundaries of the network, where the RSVP-based interfaces exist. Subsequently, the right-hand end system 112 indicates that it accepts the connection by sending an RSVP message (Resv) 118. This is encapsulated by the internal network protocol and transferred, unprocessed, across the network using the internal network protocol (Notify) message 120, and then passed on to the left-hand end system 100 over the RSVP-based interface, completing end-to-end setup. Local acknowledgement messages (Ack) 122 may be sent as required for the RSVP-based interface.

Figure 8:
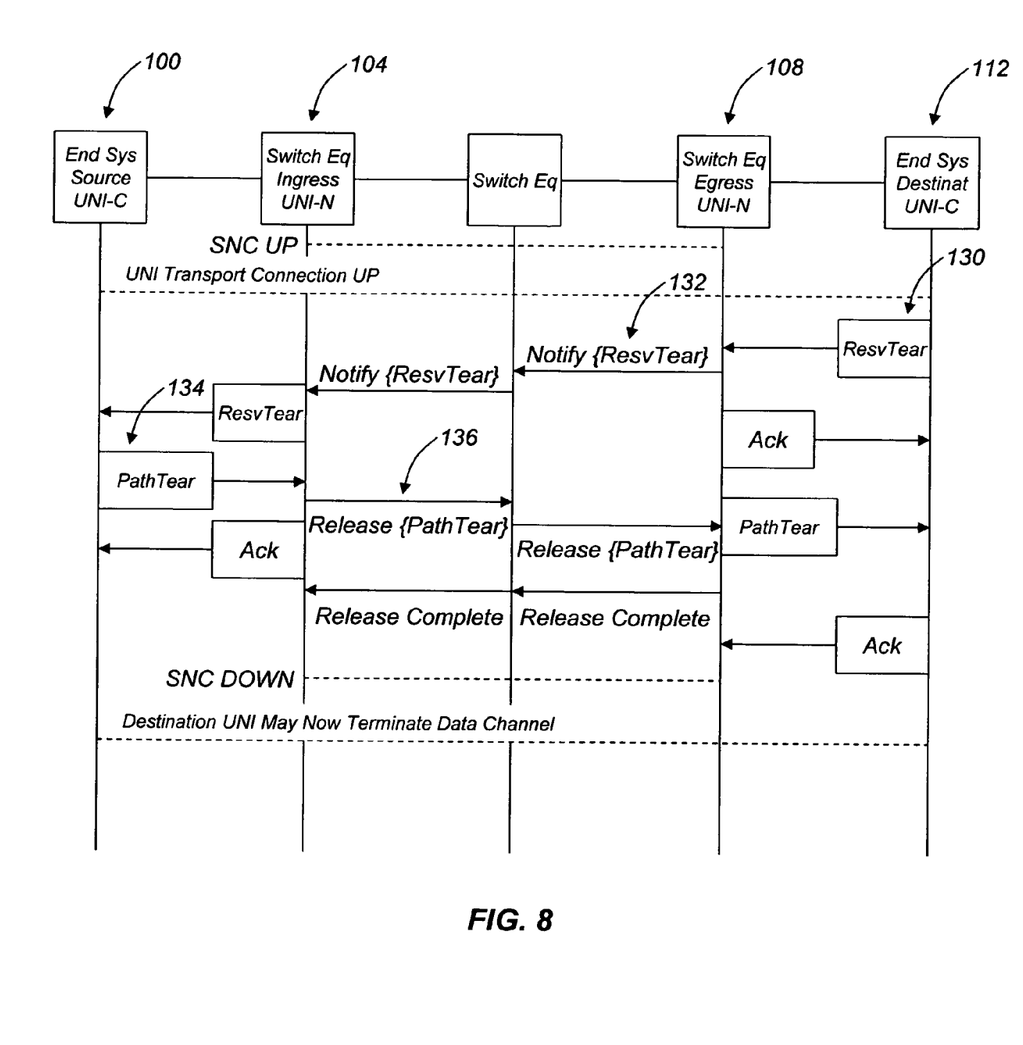
FIG. 8 is a schematic diagram illustrating an exemplary embodiment of a message sequence used for successful call teardown from destination UNI-C, in accordance with the methods and systems of the present invention.

FIG. 8 is a schematic diagram illustrating an exemplary embodiment of a message sequence used for successful call teardown from destination UNI-C, in accordance with the methods and systems of the present invention. Connection release starts from the right-hand end system 112. The right-hand end system 112 sends an RSVP message (ResvTear) 130 to initiate connection release. In this example, the ResvTear message 130 does not cause actual network action to begin, so it is encapsulated by the internal network protocol (Notify) message 132 and transferred to the left-hand end system 100 without being processed by intermediate network nodes. The ResvTear message causes the left-hand end system 100 to send a PathTear message 134 initiating teardown of the network connection. This triggers the connection release process within the internal network protocol, using the associated internal network protocol (Release) message 136. This process proceeds independently within the network, with any end-to-end-significant RSVP information encapsulated and carried within the Release message 136 and passed to the right-hand end system 112 using the PathTear message 134. As illustrated, the internal connection release process completes independently within the network, and any local acknowledgements required for RSVP processing are generated locally at the left-hand and right-hand UNI interfaces.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A method for interworking a Resource Reservation Protocol (RSVP)-based external control plane protocol with an internal control plane protocol, comprising:
   given an external control plane protocol and an internal control plane protocol, performing a high-level mapping from an external control plane protocol message/field to an internal control plane protocol message/field at a near end of an internal domain, comprising:
      encapsulating through a message-by-message mapping the external control plane protocol message/field as data in the internal control plane protocol message/field, wherein the message-by-message mapping is limited only to points at which an action is necessary in the internal domain; and
      creating a trigger in the internal control plane protocol message/field operable for initiating a desired internal control plane action comprising establishing a connection responsive to the external control plane protocol message/field requiring internal control plane action; and
   processing the external control plane protocol message/field at a remote end of the internal domain.

2. The method of claim 1, wherein the encapsulated external control plane protocol message/field in the internal control plane protocol message/field is carried from an ingress border node to an egress border node through one or more intermediate nodes without processing by the internal control plane.

3. The method of claim 2, wherein the high-level mapping from the external control plane protocol message/field to the internal control plane protocol message/field at the near end of the internal domain is performed at the ingress border node.

4. The method of claim 2, wherein the external control plane protocol message/field processed at the remote end of the internal domain is processed at the egress border node.

5. The method of claim 2, wherein processing the external control plane protocol message/field at the remote end of the internal domain comprises mapping the external control plane protocol message/field back to the external control plane protocol.

6. The method of claim 2, wherein the encapsulated external control plane protocol message/field in the internal control plane protocol message/field is carried from the ingress border node to the egress border node through the one or more intermediate nodes without making changes to the internal control plane protocol.

7. The method of claim 2, wherein the encapsulated external control plane protocol message/field in the internal control plane protocol message/field is carried from the ingress border node to the egress border node through the one or more intermediate nodes without performing processing at the one or more intermediate nodes.

8. The method of claim 1, wherein the external control plane protocol comprises RSVP.

9. The method of claim 1, wherein the internal control plane protocol comprises OSRP.

10. A system for interworking a Resource Reservation Protocol (RSVP)-based external control plane protocol with an internal control plane protocol, comprising:
given an external control plane protocol and an internal control plane protocol, a processor operable for performing a high-level mapping from an external control plane protocol message/field to an internal control plane protocol message/field at a near end of an internal domain, comprising:
the processor operable for encapsulating through a message-by-message mapping the external control plane protocol message/field as data in the internal control plane protocol message/field, wherein the message-by-message mapping is limited only to points at which an action is necessary in the internal domain; and
the processor operable for creating a trigger in the internal control plane protocol message/field operable for initiating a desired internal control plane action comprising establishing a connection responsive to the external control plane protocol message/field requiring internal control plane action; and
the processor operable for processing the external control plane protocol message/field at a remote end of the internal domain.

11. The system of claim 10, wherein the encapsulated external control plane protocol message/field in the internal control plane protocol message/field is carried from an ingress border node to an egress border node through one or more intermediate nodes.

12. The system of claim 11, wherein the processor operable for performing the high-level mapping from the external control plane protocol message/field to the internal control plane protocol message/field at the near end of the internal domain is resident at the ingress border node.

13. The system of claim 11, wherein the processor operable for processing the external control plane protocol message/field at the remote end of the internal domain is resident at the egress border node.

14. The system of claim 11, wherein processor operable for processing the external control plane protocol message/field at the remote end of the internal domain is operable for mapping the external control plane protocol message/field back to the external control plane protocol.

15. The system of claim 11, wherein the encapsulated external control plane protocol message/field in the internal control plane protocol message/field is carried from the ingress border node to the egress border node through the one or more intermediate nodes without making changes to the internal control plane protocol.

16. The system of claim 11, wherein the encapsulated external control plane protocol message/field in the internal control plane protocol message/field is carried from the ingress border node to the egress border node through the one or more intermediate nodes without performing processing at the one or more intermediate nodes.

17. The system of claim 10, wherein the external control plane protocol comprises RSVP.

18. The system of claim 10, wherein the internal control plane protocol comprises OSRP.

19. A method for interworking a Resource Reservation Protocol (RSVP)-based external control plane protocol with an internal control plane protocol, comprising:
given an external control plane protocol and an internal control plane protocol, performing a high-level mapping from an external control plane protocol refresh message/field to an internal control plane protocol refresh message/field at a near end of an internal domain, comprising:
encapsulating through a message-by-message mapping the external control plane protocol refresh message/field as data in the internal control plane protocol refresh message/field such that the encapsulated data is not processed by the internal control plane protocol, wherein the message-by-message mapping is limited only to points at which an action comprising establishing a connection is necessary in the internal domain; and
processing the external control plane protocol refresh message/field at a remote end of the internal domain.

20. The method of claim 19, wherein the encapsulated external control plane protocol refresh message/field in the internal control plane protocol refresh message/field is carried from an ingress border node to an egress border node through one or more intermediate nodes.

21. The method of claim 20, wherein the high-level mapping from the external control plane protocol refresh message/field to the internal control plane protocol refresh message/field at the near end of the internal domain is performed at the ingress border node.

22. The method of claim 20, wherein the external control plane protocol refresh message/field processed at the remote end of the internal domain is processed at the egress border node.

23. The method of claim 20, wherein processing the external control plane protocol refresh message/field at the remote end of the internal domain comprises mapping the external control plane protocol refresh message/field back to the external control plane protocol.

24. The method of claim 20, wherein the encapsulated external control plane protocol refresh message/field in the internal control plane protocol refresh message/field is carried from the ingress border node to the egress border node through the one or more intermediate nodes without making changes to the internal control plane protocol.

25. The method of claim 20, wherein the encapsulated external control plane protocol refresh message/field in the internal control plane protocol refresh message/field is carried from the ingress border node to the egress border node through the one or more intermediate nodes without performing processing at the one or more intermediate nodes.

26. The method of claim 19, wherein the external control plane protocol comprises RSVP.

27. The method of claim 19, wherein the internal control plane protocol comprises OSRP.

* * * * *